United States Patent [19]

Kubik

[11] Patent Number: 4,751,775
[45] Date of Patent: Jun. 21, 1988

[54] ROLL FOR THE PRESSURE TREATMENT OF WEBS

[75] Inventor: Klaus Kubik, Krefeld, Fed. Rep. of Germany

[73] Assignee: Eduard Küsters, Krefeld-Forstwald, Fed. Rep. of Germany

[21] Appl. No.: 892,357

[22] Filed: Jul. 31, 1986

[30] Foreign Application Priority Data

Aug. 7, 1985 [DE] Fed. Rep. of Germany ....... 3528333

[51] Int. Cl.$^4$ ............................................. B21B 13/02
[52] U.S. Cl. ................................ 29/116 R; 29/113 R; 29/116 AD
[58] Field of Search ...... 29/116 AD, 116 R, 113 AD, 29/113 R, 110; 100/162 B

[56] References Cited

U.S. PATENT DOCUMENTS

| | | | |
|---|---|---|---|
| 4,187,594 | 2/1980 | Appenzeller | 29/116 AD |
| 4,188,698 | 2/1980 | Appenzeller | 29/116 AD |
| 4,241,482 | 12/1980 | Biondetti | 29/116 AD |
| 4,307,501 | 12/1981 | Ahrweiler | 29/113 AD |
| 4,308,651 | 1/1982 | Appenzeller et al. | 29/116 AD |
| 4,319,390 | 3/1982 | Wolf | 29/116 AD |
| 4,429,446 | 2/1984 | Lehmann | 29/116 AD |
| 4,506,421 | 3/1985 | Appenzeller | 29/116 AD |
| 4,520,723 | 6/1985 | Pav et al. | 29/116 AD X |
| 4,578,847 | 4/1986 | Ahrweiler | 29/116 AD X |

FOREIGN PATENT DOCUMENTS

| | | |
|---|---|---|
| 1193739 | 5/1965 | Fed. Rep. of Germany . |
| 1193792 | 5/1965 | Fed. Rep. of Germany . |
| 1461066 | 12/1968 | Fed. Rep. of Germany . |
| 2461914 | 7/1976 | Fed. Rep. of Germany . |
| 2744524 | 11/1978 | Fed. Rep. of Germany . |
| 2909277 | 9/1980 | Fed. Rep. of Germany . |
| 3022491 | 12/1981 | Fed. Rep. of Germany . |
| 3128722 | 2/1983 | Fed. Rep. of Germany . |

Primary Examiner—Howard N. Goldberg
Assistant Examiner—Irene Cuda
Attorney, Agent, or Firm—Kenyon & Kenyon

[57] ABSTRACT

A roll (20) comprises a rotating hollow roll (1) and a stationary crosspiece (5) which extends through the hollow roll (1) lengthwise and the ends of which protrude from the hollow roll (1) and are supported there. The crosspiece (5) comprises a support shoe (10) which is closed against a supporting part (6) of the crosspiece (5) except for feedlines, which is held at the crosspiece (5) in the circumferential direction but is movably guided in the action plane (9) of the roll (20) against the inside circumference (4) of the hollow roll (1) and can be pressed against the inside circumference (4) of the hollow roll (1) under the pressure of the pressure liquid. On the side facing the inside circumference (4) of the hollow roll (1), the support shoe (10) carries longitudinal seals (7) and guiding surfaces (12) which divide off a longitudinal chamber (8) for receiving pressure liquid generating the line pressure, and leakage chambers (15) for receiving leakage liquid.

24 Claims, 4 Drawing Sheets

ROLL FOR THE PRESSURE TREATMENT OF WEBS

BACKGROUND OF THE INVENTION

The invention relates to a roll for the pressure treatment of webs of material.

Such a roll is known from German Pat. No. 27 44 524. Pressure liquid in a longitudinal chamber in a hollow roll exerts a uniform hydraulic pressure against the inside circumference of the hollow roll, whereby the line pressure in the rolling gap is brought about. A stationary crosspiece extending through the hollow roll for supporting the roll bends under the distributed hydraulic load without making contact because of the spacing at the inside circumference of the hollow roll. In this manner the hollow roll can largely be kept free of bending due to the load.

In most cases, the important point is to be able to exert forces as large as possible with a relatively small hydraulic pressure. Longitudinal seals engaging the inside circumference of the hollow roll are arranged at the point of greatest width opposite each other or shifted 180° relative to each other on both sides of the crosspiece. The pressures in the longitudinal chamber are normally in the range between 0 and 3 bar. The seal at the transverse end seals and the longitudinal seals of the longitudinal chamber need not be hermetic. Pressures of the order of magnitude given can be maintained at a hydrodynamic equilibrium with an acceptable pump output even if small amounts of leakage liquid continuously emerge at the seals. This leaking liquid accumulates in the space between the crosspiece and the inside circumference of the hollow roll, outside of the longitudinal pressure chamber. This space is therefore filled soon with leakage liquid.

If the longitudinal pressure chamber opposite the longitudinal chamber is filled with leakage liquid, heavy turbulence arises within the pressure liquid because the liquid is taken along at the rapidly revolving inside circumference of the hollow roll; this turbulence consumes the preponderant part of the driving power of such a roll, especially at higher speeds. Provision is therefore made that the opposite longitudinal chamber is not filled with liquid. This purpose is served by guide surfaces or resilient strips which wipe off the liquid adhering to the inside circumference of the hollow roll close to the longitudinal seals and direct the fluid immediately into suitable discharge or suction canals.

In the known embodiment, the guide surfaces are directly attached to the crosspiece and either rest lightly against the inside circumference of the hollow roll or are spaced a very small distance from the inside circumference. In as much as crosspiece is bent up to 30 mm inside the hollow roll for long rolls and large loads, it is not easy to assure over the length of the roll sufficiently uniform contact of the guide surfaces in tape or strip form at the inside circumference of the hollow roll. The fastening point and the contact point change their mutual position considerably under such deflections, and the guiding surface should be in a position to bridge such changes by elastic deformation. The guide surfaces then either rest too firmly against the inside circumference of the hollow roll and wear rapidly, or they are lifted in the center where the greatest spacing change takes place off the inside circumference of the hollow roll and no longer fulfill their function.

These problems become more difficult if rolls are involved which do not have mutually opposite longitudinal seals but rather relatively closely adjacent longitudinal seals in the vicinity of the rolling gap which are removed from each other only by a circumferential angle of exemplarily 30° to 40° and define a correspondingly narrow longitudinal chamber. Such roll designs are employed in the paper industry, if applications with particularly high web velocities up to the order of magnitude of 2,000 m/min are involved. With a narrow chamber the turbulence losses in the pressure liquid contained therein can be kept lower.

Since the guide surfaces must be adjacent to the longitudinal seals and the longitudinal seals are situated in such rolls which are known from German Auslegeschrift No. 24 61 914, in the vicinity of the action plane, i.e., in the vincinity of the plane going through the axis of the roll and its counter roll, the guide surfaces are subjected, if the cross piece is bent, to practically the full excursion, i.e., the full change of spacing between the ends of the cross piece and the zone in the center which is farthest away from the inside circumference of the hollow roll. A suitable structure of the guide surfaces to maintain a still usable contact or near-contact between their fastening points and the points of contact with the inner circumference of the roll particularly for such changes of spacing is especially difficult to design.

This design problem concerns, however, not only the guiding surfaces but also the longitudinal seals which in this case can no longer be realized by L-shaped seals according to German Pat. No. 11 93 739 but as strip gaskets in the manner shown in German Auslegeschrift No. 24 61 914 which can be dislocated in planes located parallel through the action plane against the inside circumference of the hollow roll. It is not easy to design seals of this kind which can accommodate a stroke or shift of 30 mm and more and which are furthermore free of vibration phenomena which can be generated by the inside circumferential surface sliding past in the transverse direction at high speed.

It is an object of the invention to develop a roll of the above described type so that the guiding surfaces as well as the longitudinal seals can tightly cooperate without jamming, and regardless of vibration with the inside circumference of the hollow roll even if the crosspiece is bent substantially within the hollow roll and with a corresponding change of spacing between the cross piece and the inside circumference of the hollow roll.

SUMMARY OF THE INVENTION

A roll assembly for the pressure treatment of webs of material comprises, in accordance with the present invention, a rotatable hollow roll, a stationary crosspiece and a support shoe. The hollow roll has a working roll circumference in the form of a cylindrical outer surface and further has a cylindrical inner surface, while the stationary crosspiece extends longitudinally through the hollow roll in spaced relationship with respect to the inner surface thereof. A pair of opposite ends of the crosspiece project from the hollow roll so as to be supported in a machine frame. The support shoe is mounted on the crosspiece for motion in a radial direction, the support show being circumferentially fixed to the crosspiece. The support shoe extends longitudinally along the hollow roll substantially from a first end thereof to a second end thereof opposite the first end. An auxiliary pressure chamber is provided between the support shoe and a surface of the crosspiece.

In accordance with the present invention, a pair of longitudinal sealing members and a pair of transverse sealing members which together define and seal a longitudinally extending liquid-receiving main pressure chamber in the hollow roll between the inner surface thereof and the crosspiece are attached to the support shoe on a side thereof facing the inner surface of the hollow roll. The sealing members are disposed in sealing contact with the inner surface of the hollow roll, the longitudinal sealing members extending longitudinally the hollow roll substantially from the first end thereof to the second end thereof. The transverse sealing members are disposed at the opposite ends of the hollow roll. Pressurization feed lines are provided for controllably pressurizing the auxiliary pressure chamber to move the support shoe radially outwardly towards the inner surface of the hollow roll so that the longitudinal sealing members and the transverse sealing members are pressed against the inner surface of the hollow roll. The pressurization feed lines extend through the crosspiece to the auxiliary pressure chamber. A pair of elongate guiding members are disposed in the hollow roll outside the main pressure chamber for forming in part with respective longitudinal sealing members a pair of longitudinally extending accumulation chambers on circumferentially opposed sides of the main pressure chamber for accumulating pressure liquid from the inner surface of the hollow roll during rotation thereof. The guiding members are disposed on the support shoe proximately to the inner surface and to respective ones of the longitudinal sealing members.

The effect of these features is that the longitudinal chamber containing the pressure liquid is no longer formed at the crosspiece proper, but between the support shoe, the longitudinal seals provided thereon and the inside circumference of the hollow roll and does not change if the crosspiece is bent. The support shoe always rests uniformly with the longitudinal seals and the transverse end seals against the inside circumference or surface of the hollow roll and is towards the inside circumference of the hollow roll by the pressure of the pressure liquid. The displacement takes place between the support shoe and the crosspiece. The seals and also the guiding surfaces are not affected by this displacement.

The support shoe is continuous over the length of the longitudinal chamber, i.e., in most designs, over the length of the roll.

In a first embodiment of interest, the support shoe can be supported by a number of circular cylindrical piston/cylinder units distributed along the crosspiece. Another alternative is a support shoe having a bridge or strip piston continuous in the longitudinal direction of the crosspiece, as is known for example through German Offenlegungsschrift No. 14 61 066 in another design of rolls.

In one embodiment of the present invention there is no connection provided between the action surfaces of the pressure in the longitudinal chamber and in the piston/cylinder unit. The pressure liquids fed to the two hydraulic chambers, however, must then have an accurately controlled, mutually dependent pressure, so that the contact of the longitudinal seals at the inside circumference of the hollow roll is assured with an accurately fitting contact pressure.

If the main pressure chamber and the auxiliary pressure chamber communicate with one another, the same pressure may prevail in both chambers. Pressing the longitudinal seals to the inner surface of the hollow roll under the exactly fitting pressure is accomplished by the provision that the effective cross section of the main pressure chamber is somewhat smaller than that of the auxiliary pressure chamber. The difference in cross sections results in an excess pressure on the support shoe which keeps the latter in contact automatically at all occurring pressure levels with a corresponding force component against the inside circumference of the hollow roll.

To accommodate spacing changes when the crosspiece is dislocated relative to the support shoe if bending occurs, movable liquid-transport connections bridging the crosspiece and the support shoe are provided.

The connections may each take the form of a bushing extending into a bore or passage in the piston of a piston/cylinder unit, the bushing being inclinable relative to its longitudinal axis and provided with external sealing rings.

This embodiment permits not only position changes in the longitudinal direction of the bushings, but also small position changes in the transverse direction which can come about, for instance, by different thermal expansion of the support shoe and the supporting part of the crosspiece.

The guiding surfaces can be designed in a manner known from German Pat. No. 27 44 524 as resilient tapes or strips or, however, as rigid, i.e., one-piece or screwed-on strips connected to the support shoe.

In the latter case, the support shoe rests via the strips against the inside circumference of the hollow roll. So that there is no possibility of a multiple fit (since also the longitudinal seals must rest against the inside circumference of the hollow roll, forming a seal) it should be possible in this case, according to claim 1, to press the longitudinal seals resiliently against the inside circumference of the hollow roll.

A design of the fixed strips wherein the strips have triangular cross sections and have convex sides forming acute angles with the roll's inside surface makes it possible to transport pressure liquid sticking to the inside circumference of the hollow roll, if it is taken along into a corner with a acute drawing-in angle, under the point of contact between the roll and a fixed strip into a leakage or accumulation chamber where it is wiped off by the adjacent longitudinal seal and is discharged through lines provided for this purpose.

In a guide strip with a triangular cross section in accordance with the present invention, a guiding surface is set in the manner of a chisel in the direction opposed to the direction of rotation against the inside circumference of the hollow roll and the pressure liquid escaping from under the adjacent longitudinal seal can be wiped off after being taken along briefly by the inside circumference of the hollow roll.

To that the roll can be operated in both directions of rotation, a symmetrical design of the support shoe is advisable.

Causing pressure fluid to flow in opposite longitudinal directions through the leakage or accumulation chambers serves to equalize the temperature along the roll. If the flow is only unilateral, a noticeable temperature gradient can occur with the relatively long flow path from one end of the roll to the other end. To this end also, the pressure chamber can be subdivided into two adjacent longitudinal subchambers and the pressure liquid caused to flow in opposite directions through those subchambers.

In the embodiment examples discussed so far, the longitudinal chamber continues practically over the entire length of the roll and therefore, only a pressure uniform over the length of the roll can be exerted against the inside circumference of the hollow roll. However, it is desired in many cases to modify the pressure exerted against the inside circumference of the hollow roll over the length of the hollow roll to exert, for instance, a somewhat higher or lower pressure at the ends of the roll.

In one embodiment of the present invention, this can be realized by aligning several mutually independent support shoes one after the other along the roll.

Total independence of the individual sections, however, is not necessary in many cases and also causes an increased amount of technical means for seals and feedlines.

An alternative embodiment is therefore preferred wherein a pressure-proof partition extends in a transverse direction with respect to the main pressure chamber and subdivides that chamber into subchambers which are pressurizable at respective pressurization levels.

Since the hollow roll is a very stiff structural part and bends only very slightly under different internal pressures, the adaptibility of this support shoe is sufficient to bring about the desired influence on the line pressure.

DETAILED DESCRIPTION

Figure 1:
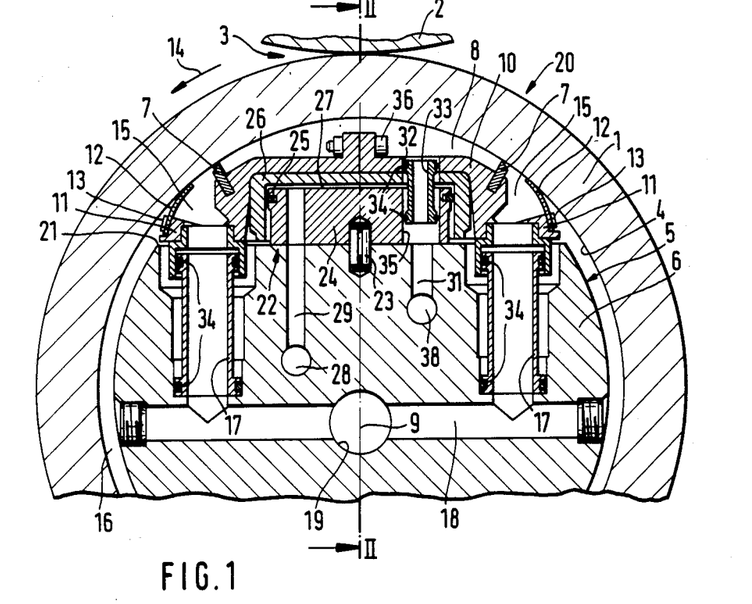
FIG. 1 shows a cross section through the upper part of the roll according to the invention.

A roll, designated with reference numeral 20 as a whole in FIG. 1, comprises a revolving hollow roll 1, which forms the working roll circumference and forms a rolling gap 3 with a counter roll 2 (schematically represented) arranged on top thereof according to FIG. 1. The hollow roll 1 has a smooth cylindrical inside circumference 4.

In the hollow roll 1, a stationary crosspiece 5 is arranged which extends through the hollow roll lengthwise, protrudes from the latter at the ends and is supported there in a machine frame or the like. The crosspiece 5 comprises a supporting part 6 and on top of it, i.e., on the side of the rolling gap 3, a support shoe 10 which extends through the length of the hollow roll 1 and has a cross section in the shape of a "U" open toward the bottom. Near the two corners, longitudinal seals 7 are arranged which project approximately radially toward the inside circumference 4 of the hollow roll 1, consist of a suitable bronze alloy and through which the support shoe 10 is braced against the inside circumference 4 of the hollow roll 1, forming a seal. The longitudinal seals 7 extend lengthwise to the vicinity of the ends of the hollow roll 1, where transverse end seals, not shown, are provided on the support shoe 10, which close off the longitudinal chamber 8 formed by the support shoe 10, the two longitudinal seals 7 and the inside circumference 4 of the hollow roll 1 in the two axial directions.

At the free ends of the U profile pointing downward, the support shoe 10 has parts 11 overhanging supporting part 6 and projecting outwardly, i.e., perpendicularly to an axial plane 9 of the roll 20, at the outer edges of which guiding surfaces 12 are fastened with spacing from the inside circumference 4 of the hollow roll 1, the guiding surfaces being formed by resilient strips of bronze or a suitable plastic extending over the length of the longitudinal chamber 8. The guiding surfaces or resilient strips 12 are each one edge by means of screws 13 to the overhanging parts 11 and rests with its other edge against the inside circumference 4 of the hollow roll 1 under a slight amount of spring tension. The guiding surfaces 12 protrude from the overhanging parts 11 toward the longitudinal seals 7 up to their proximity and form an acute angle with the inside circumference 4 of the hollow roll 1. It is not absolutely necessary that the guiding surfaces 12 rest against the inside circumference 4 under pressure; it is also sufficient if there is a distance, albeit small, from the forward edge of the guiding surfaces 12 to the inside circumference 4.

If the hollow roll 1 rotates in the direction of the arrow 14, liquid which has escaped from under the left longitudinal seal 7 and was taken along at the inside circumference 4 is wiped off by the left guiding surface 12 and is connected into the leakage chamber 15 which is formed on the outside of the U-shaped support shoe 10 between the leg thereof, the overhanging part 11, the guiding surface 12 and the longitudinal seal 7. The result here is to prevent substantial quantities of liquid from being transported into the longitudinal chamber 16 which is opposite the longitudinal chamber 8 and occupies the rest of the space between the crosspiece 5 and the inside circumference 4 of the hollow roll 1. Filling the longitudinal chamber 16 with such a liquid would lead to high turbulence losses at high speeds of the hollow roll 1.

Thin liquid films still adhering to the inside circumference 4 of the hollow roll 1 are taken along through under the right guiding surface 12 into the right leakage chamber 15 and are wiped off from the inside circumference 4 by the longitudinal seal 7, so that it accumulates in the right leakage chamber 15. The right guiding surface 12 prevents a more extensive build-up zone from forming in front of the respective longitudinal seal 7. The liquid accumulated in the leakage chambers 15 is discharged or suctioned off via bushings 17 and lines 18, 19. Although in the drawing, the bushings 17 for the two leakage chambers 15 are shown at the same height or longitudinal position along the roll, it may nevertheless be advisable in practice to attach the bushings 17 for the two leakage chambers 15 at different ends of the roll 5 so that the flow in the leakage chambers 15 is in different directions and a certain amount of temperature equalization in the hollow roll 1 takes place. The pressure liquid in the chamber 8 generally has a temperature above the ambient temperature. The design of the two leakage chambers 15 and also of the entire support shoe 10 is symmetrical to the action plane connecting the axes of the roll 20 and the counter roll 2 although the functions of the two leakage chambers 15 are somewhat different for a given direction of rotation 14. The symmetry, however, opens up the possibility to have the roll rotate in both directions.

The support shoe 10 is not fastened to the supporting part 6 of the crosspiece 5 but is conducted only in the circumferential direction and movable in the direction of the action plane 9 relative to the supporting part 6 of the crosspiece 5, by the provision of, on the flat upper side 21 of the supporting part 6, piston/cylinder units 22 which are distributed over the length of the roll 20 and which comprise in the embodiment example pistons 24 provided with respective piston rings 25 and fastened to the upper side 21 of supporting part 6 in the embodiment example by means of a pin 23. Piston/cylinder units 22 also each comprise a reversed cup-shaped cylinder 26 which is located in the interior of the support shoe 10. A cylinder space 27 can be filled via a feedline 28 in the supporting part 6 of the crosspiece 5 and a branch line 29 which passes through the piston 24. The fluid in cylinder space 27 lifts the support shoe 10 and presses the longitudinal seals 7 with a predeterminable pressure against the inside circumference 4 of the hollow roll 1.

The longitudinal chamber 8 on the top side of the support shoe 10 is supplied with pressure liquid via a line 38 extending through the supporting part 6 of the crosspiece 5 and via a branch line 31. The line 31 communicates with a hole 35 in the piston 34, with which a hole 32 in the support shoe 10 and in the bottom of the cylinder 26 is aligned. In the holes 32 and 35 is located with lateral play a bushing 33 which carries at its ends outer ring seals 34 which rest against the holes 32 and 35, forming seals. In this manner, the longitudinal chamber 8 can be supplied with pressure liquid independently of the cylinder chamber 27. The pressures in the chambers 8 and 27 are controlled with mutual dependence so that the support shoe 10 is not lifted off the inside circumference 4 of the hollow roll 1.

The mobility of the connection between the longitudinal chamber 8 and the hole 35 in the piston 24 serves to permit a certain amount of displacement of the cylinder 26 in the support shoe 10 in the latter's longitudinal direction which can happen in the case of different thermal expansion of the support shoe 10 and the supporting part 6 of the crosspiece 5. In addition, the bushing 33 permits a spacing of the upper side 21 of the supporting part 6 of the crosspiece 5 from the support shoe 10 without interruption of the connection if the supporting part 6 is bent downward in the middle of the roll according to FIG. 1 under the pressure acting in the longitudinal chamber 8 against the inside circumference 4. The bushings 17 serve for connecting the leakage chamber 15 to the lines in the supporting part 6 of the crosspiece 5 and have the same purpose as the bushing 33. They too have outer ring seals 34 at their ends and are capable of maintaining the connections between the leakage chambers 15 and the lines 18, 19 even if the support shoe 10 and the supporting part 6 of the crosspiece 5 are displaced relative to each other in the longitudinal direction and parallel to the action plane 9.

Figure 2:
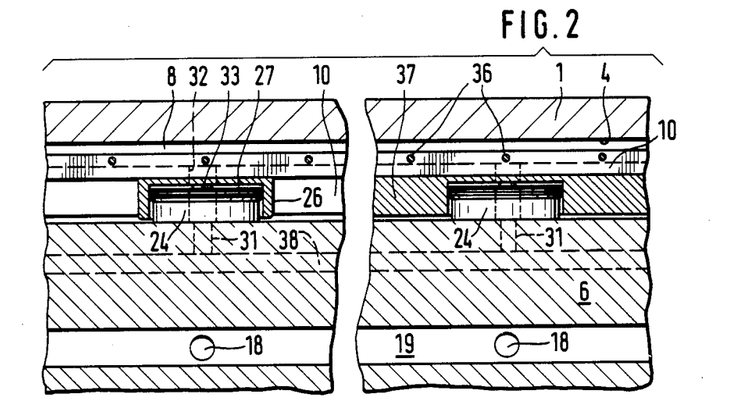
FIG. 2 shows a longitudinal section taken along to the line II—II in FIG. 1 on a somewhat reduced scale.

For production reasons, the support shoe 10 consists, in the embodiment example 10 shown, of two symmetrical halves which are connected to each other by screws 36 along the action plane 9. Instead of accommodating individual cup-shaped cylinders in the interior of the support shoe 10 which can be displaced somewhat along the support shoe 10 as indicated in FIG. 2 to the left, a continuous strip 37 can also be provided, in which individual holes for the pistons 24 are made (see FIG. 2, to the right). However, provision must then be made that the pistons on the top side 21 of the supporting part 6 can be displaced slightly in the longitudinal direction so that jamming is avoided.

To the extent that in the further embodiment examples, the parts are functionally equivalent, the parts carry the same reference numerals as in the embodiment example of FIGS. 1 and 2. Apart from design details, the essential difference of the roll 40 of FIGS. 3 and 4, as compared to FIGS. 1 and 2, consists in that no individual circular cylindrical pistons 24 are distributed over the length of the crosspiece 5 but a longitudinal piston 44 continuous over the entire length of crosspiece strap 5 and protruding from the top side 21 of the supporting part 6 of the crosspiece is provided which in the embodiment example is unitary with the supporting part 6. The longitudinal piston 44 fills the entire interior 41 of a support shoe 30 lengthwise. A cylinder chamber 42 above the longitudinal piston 44 is supplied with pressure liquid in a manner similar to the embodiment example of FIGS. 1 and 2. A further difference from this embodiment is, however, that the same pressure liquid gets into the longitudinal chamber 8 through a passage 43 in the support shoe 30 and ensures that pressure is exerted against the inside circumference 4 of the hollow roll 1. Since the longitudinal chambers 8 and 42 are of the same length, but the width 45 of the longitudinal chamber 8 is somewhat smaller than the width 36 of the longitudinal chamber 42, the support shoe 30 always has a certain amount of excess force which keeps it in contact with the inside circumference 4 of the hollow roll 1 via the longitudinal seals 7.

Figure 4:
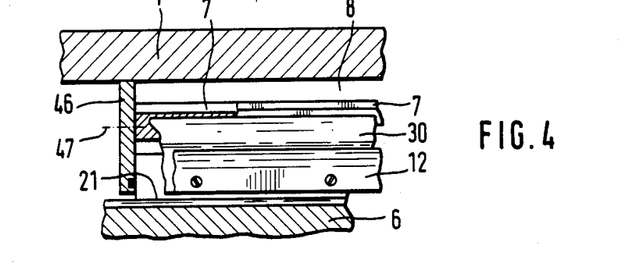
FIG. 4 shows a view, partially in cross section, taken along the line IV—IV in FIG. 3.

In FIG. 4, the situation at the end of the longitudinal chamber 8 can be seen. To the support shoe 30, a transverse end seal 46 is screwed which extends in the transverse direction and closes the longitudinal chamber 8 and the leakage chambers 15 at the end of the longitudinal chamber 8. The longitudinal seals 7 extend up to the transverse seal 46 or nearly thereto. Slight leaks are unimportant because possible leakage liquid is caught immediately in the leakage chambers 15.

The leakage chambers 15 are drained in the same way via bushings 17 as in the embodiment example according to FIGS. 1 and 2.

Figure 3:
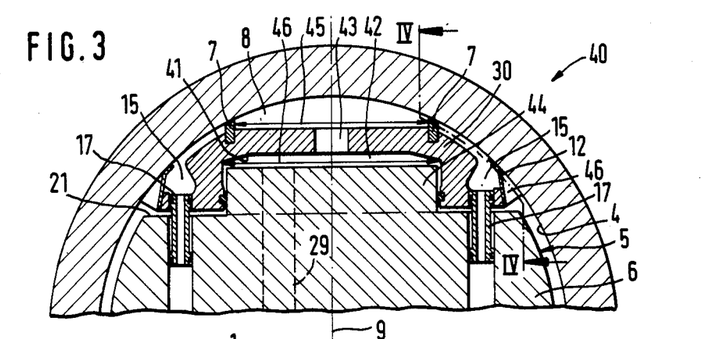
FIG. 3 shows a cross section similar to FIG. 1, through another embodiment.
Figure 5:
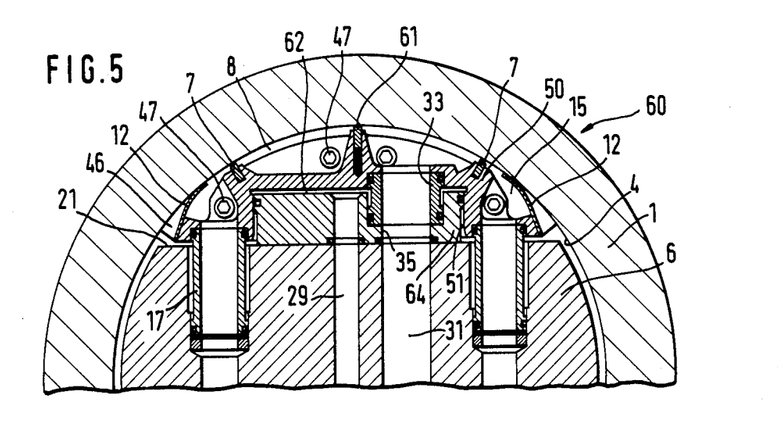
FIGS. 5 and 6 show sections similar to FIG. 1, through further embodiments.

The same applies to roll 60 of FIG. 5, in which a continuous longitudinal piston 64 similar to the longitudinal piston 44 of FIG. 3 is likewise divided. However, the longitudinal piston 64 is a separate part connected to the supporting part 6 of the crosspiece 5. The longitudinal chamber 8 is supplied here as in FIGS. 1 and 2, i.e., separately from the pressure supply of a chamber 62 over the longitudinal piston 64, the connecting line to chamber 8 being formed by a bushing 33 which engages the piston 64 and a support shoe 50 and is somewhat movable and sealed. With respect to the transverse end seal 46 fastened to the end of the support shoe 50 by means of screws 47, the roll 60 corresponds to the roll 40.

In the center between the longitudinal seals 7, a subdivision continued over the length of the longitudinal chamber 8 is provided in the form of a strip 61 which is pressed resiliently and radially against the inside circumference 4 of the hollow roll 1. The strip 61 serves to form two longitudinal subchambers in the longitudinal chamber 8, in which the flow of the pressure liquid can be conducted in opposite directions in order to bring about temperature equalization.

Figure 6:
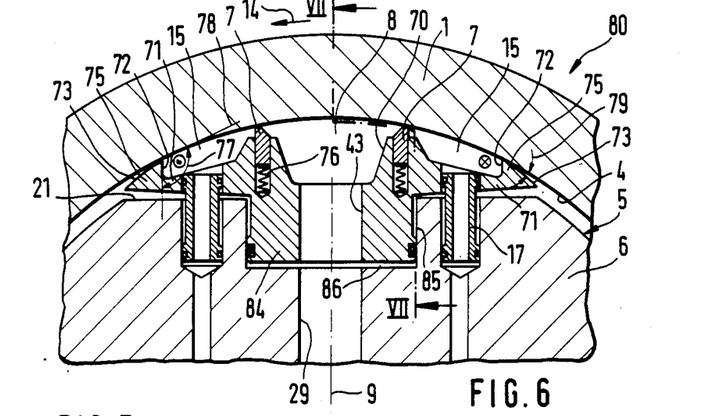
Figure 7:
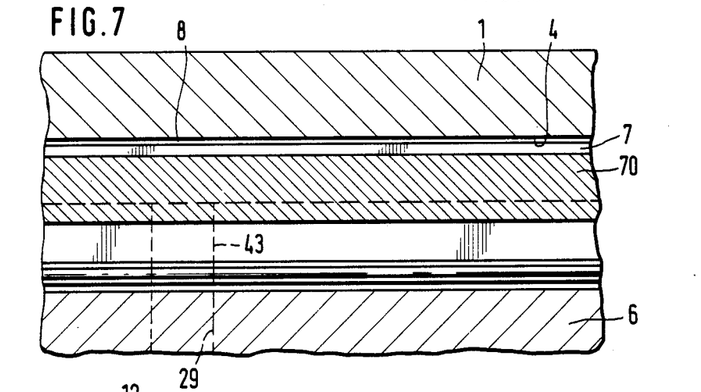
FIG. 7 shows a view taken along to the line VII—VII in FIG. 6.

While the guiding surfaces 12 are formed by elastically resilient strip material and the support shoes 10, 30, 50 are guided at the inside circumference 4 of the hollow roll 1 on longitudinal seals 7 firmly connected thereto, the situation is the reverse in the case of the roll 80 of FIGS. 6 and 7: the guiding surfaces 72 are formed here by continuous rigid strips 75 integral with a support shoe 70 which have a substantially triangular cross section and are formed at the ends of the parts 71 of the support shoe 70 overhanging the flat top side 21 of the supporting part 6 of the crosspiece 5. On the side facing the action plane 9, the strips 75 are provided with boundary surfaces which are approximately parallel to the action plane 9 and form the guiding surfaces 72, and can fulfill a wiping function as will be clear, with the direction of rotation 14 indicated, at the boundary surface 72 to the left in FIG. 6. The strips 75 rest with the upper corner of the triangular cross section, i.e., with the upper edge of the guiding surface 72, against the inside circumference 4 of the hollow roll 1 in such a manner that an angle 77 of the guiding surface 72 with a section 78 of the tangent, opposed to the direction of rotation 14 with the inside circumference 4 at the contact point is obtuse.

The second triangular side of the cross section of the strip 75 is formed by the underside facing the supporting part 6, and the third side by the convex boundary surface 73 which faces the inside circumference 4 and forms with the inside circumference 4 of the hollow roll 1 a corner with a very acute pulling-in angle 79 and makes a transition to the boundary surface 72 with a sharp edge. Thus, the basic function of the strip 75 is preserved also if there is wear at the edge. The function consists of wiping, with the direction of rotation indicated, at the left-hand boundary surface 72 and of drawing liquid still sticking to the inside circumference 4 into the right-hand leakage chamber 15 at the right hand corner between the inside circumference 4 and the convex boundary surface 73.

Since the support shoe 70 rests in this case on the strips 75 at the inside circumference 4, the longitudinal seals 7 must in this case be supported resiliently relative to the support shoe 70, as by springs 76.

The piston/cylinder unit, in the case of the roll 80, comprises a longitudinal piston 84 which is formed on the support shoe 70, extends over its length and engages a longitudinal slot 85 of rectangular cross section in the upper side 21 of the supporting part 6 of the crosspiece 5. In the cylinder chamber 86 under the longitudinal piston 84, the same pressure prevails as in the longitudinal chamber 8. The latter therefore has again a somewhat smaller width, as in FIG. 3.

Figure 8:
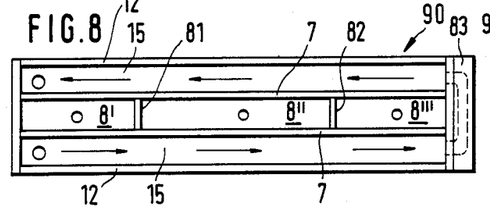
FIG. 8 shows a schematic top view of a support shoe shown in FIG. 6, in which a longitudinal pressure chamber is subdivided in the longitudinal direction into three individual chambers.

In the embodiment examples described hereinabove, the longitudinal chamber 8 extends over the length of the roll so that a uniform pressure is exerted throughout that entire length against the inside circumference 4 of the hollow roll 1. In FIG. 8, a design is indicated for modifying the exertion of pressure against the inside circumference 4 of the hollow roll 1 over the length of the roll by subdividing the continuous longitudinal chamber 8 into three longitudinal subchambers 8', 8" and 8'" by pressure-proof subdivisions 81, 82 extending transversely thereto. The pressures in the longitudinal subchambers 8', 8", 8'" can be set differently via separate feedlines. Instead of the two subdivisions 82, 83, also more subdivisions can be chosen. In many cases, however, it is already sufficient if the pressure at the edges of the web can be adjusted differently from the central region. However, a support shoe 90 in the design of FIG. 8 is a single part which extends over the length of the roll. The liquid flowing in the leakage chambers 15 is deflected by a head piece 83 attached at one end of the support shoe 90, so that it flows in opposite directions in the two leakage chambers 15 and temperature equalization is obtained in this manner.

Figure 8A:
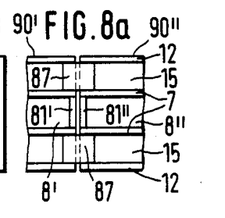
FIG. 8a shows schematically a corresponding partial view of a butt joint between successive separate support shoes.

In the embodiment example of FIG. 8a, the support shoe is no longer continuous but is divided into individual partial support shoes 90', 90" which are separated from each other. At the joints between the longitudinal subchambers 8', 8" are provided subdivision 81', 82' transverse end seals and separate the longitudinal subchambers 8, 8" from each other. Also the leakage chambers 15 are separated from each other at the joint but the gap is bridged by a resilient foil 87 so that the leakage liquid can pass between the partial support shoes 90', 90" and overall can execute the opposed motions as in FIG. 8.

Figure 9:
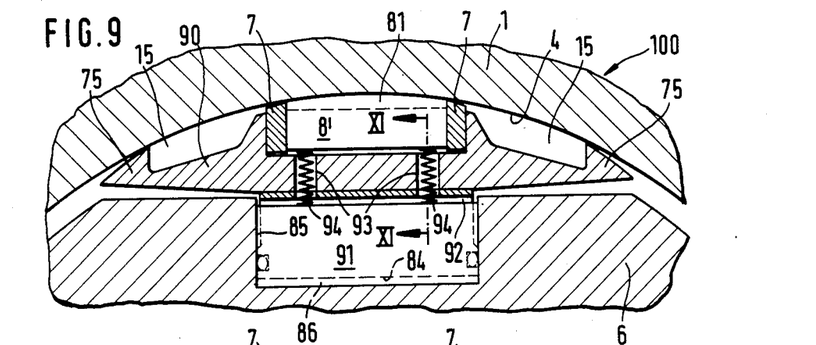
FIG. 9 shows a cross section corresponding to FIG. 6 at the point of a subdivision, i.e., taken along the line IX—IX in FIG. 10.
Figure 10:
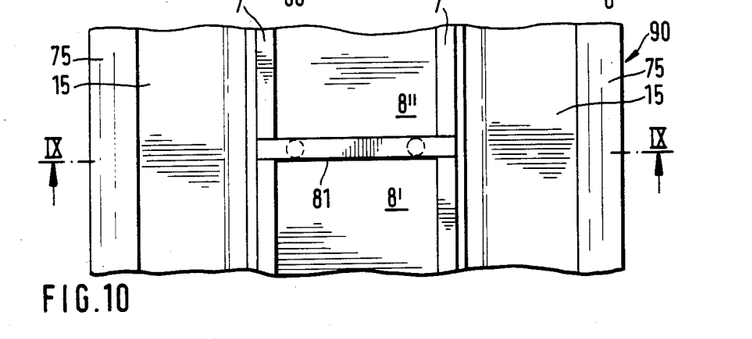
FIG. 10 shows a partial view from above onto a support shoe illustrated in FIG 9.
Figure 11:
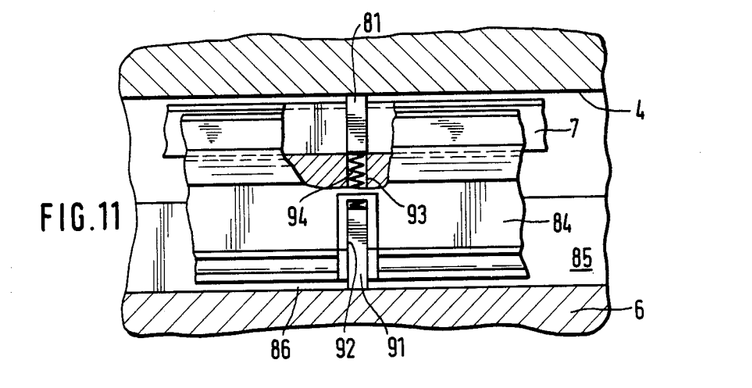
FIG. 11 shows a partial view from the right onto the support shoe of FIG. 9 and partially a cross section taken along the line XI—XI in FIG. 9.

FIGS. 9 to 11 show a practical embodiment for a subdivision according to FIG. 8. The support shoe 90 is similar to the support shoe 70 in FIG. 6. Between the longitudinal chambers 8', 8" a subdivision 81 in the form of a plate filling the inside cross section as far as possible is provided. Small gaps which may occur due to the different wear or tolerances are of no consequence. The subdivision 81 is supported, in a manner not shown, in the longitudinal direction of the longitudinal chambers 8', 8", but can shift slightly, according to FIG. 9 from the top down or perpendicularly to the plane of the drawing in FIG. 10.

Just below the subdivision 81 a likewise plate-shaped subdivision 91 is provided which extends in the transverse direction, largely fills the cross section of the longitudinal slot 85 and is guided movably in a transverse slot 92 of the longitudinal piston 84 in a transverse plane. In the plane of the subdivisions 81, 91 there are provided in the interposed part of the support shoe 90, holes 93 which are situated in the transverse plane and in which springs 94 are arranged which are braced against the underside of the subdivision 81 and against the top side of the subdivision 91 and push them against the inside circumference 4 of the hollow roll 1 or against the bottom of the longitudinal slot 85.

A corresponding subdivision is also provided at the boundary between the longitudinal chambers 8" and 8'". Small leaks in the bulkheads formed by the subdivisions 81, 91 are of no consequence since a hydrodynamic equilibrium develops in operation which is sufficient for maintaining the desired pressure difference.

In each of the longitudinal chambers 8', 8" and 8'", there is like in the embodiment according to FIG. 6, a connection between the space 86 under the longitudinal piston 84 and the respective longitudinal chambers 8', 8″ and 8‴. In this manner, the pressures in these spaces remain the same and the pressure of the support shoe 90 is generated in the longitudinal section corresponding to the longitudinal subchambers 8′, 8″, 8‴ by the difference in the cross section, regardless of the magnitude of the pressure.

What is claimed is:

1. A roll assembly for the pressure treatment of webs of material, comprising:
   a rotatable hollow roll having a working roll circumference in the form of a cylindrical outer surface, said hollow roll having a cylindrical inner surface;
   a stationary crosspiece extending longitudinally through said hollow roll, said crosspiece being spaced from said inner surface, said crosspiece having a pair of opposite ends projecting from said hollow roll for support in a machine frame;
   a support shoe mounted on said crosspiece for motion in a radial direction, said support shoe being circumferentially fixed to said crosspiece, said support shoe extending longitudinally along said hollow roll substantially from a first end of said hollow roll to a second end thereof opposite said first end;
   means for defining an auxiliary pressure chamber between said support shoe and a surface of said crosspiece;
   sealing means for defining and sealing a longitudinally extending liquid-receiving main pressure chamber in said hollow roll between said inner surface and said crosspiece, said sealing means including a pair of longitudinal sealing members disposed in said hollow roll in sealing contact with said inner surface, each of said longitudinal sealing members extending longitudinally along said hollow roll substantially from said first end of said hollow roll to said second end thereof, said sealing means further including a pair of transverse sealing members disposed in said hollow roll in sealing contact with said inner surface at said first end and said second end, respectively, said longitudinal sealing members and said transverse sealing members being attached to said support shoe on a side thereof facing said inner surface;
   pressurization means for controllably pressurizing said auxiliary pressure chamber to move said support shoe radially towards said inner surface so that said longitudinal sealing members and said transverse sealing members are pressed against said inner surface, said pressurization means including feedlines extending through said crosspiece to said auxiliary pressure chamber; and
   accumulation means for accumulating pressure liquid from said inner surface during rotation of said hollow roll, said accumulaion means including a pair of elongate guiding members disposed in said hollow roll outside said main pressure chamber, said guiding members being disposed on said support shoe proximately to said inner surface and to respective ones of said longitudinal sealing members, said guiding members forming in part with said respective ones of said longitudinal sealing members a pair of longitudinally extending accumulation chambers on circumferentially opposed sides of said main pressure chamber, said accumulation chambers being positioned between said inner surface and said crosspiece.

2. The roll assembly defined in claim 1 wherein said support shoe is supported on said crosspiece by at least one piston/cylinder unit.

3. The roll assembly defined in claim 2 wherein said support shoe is supported on said crosspiece on a plurality of piston/cylinder units of circular cross section distributed in spaced relationship with respect to each other substantially from said first end to said second end of sale hollow roll.

4. The roll assembly defined in claim 2 wherein said piston/cylinder unit extends substantially from said first end to said second end of said hollow roll.

5. The roll assembly defined in claim 2 wherein said auxiliary pressure chamber is formed between a piston and a cylinder of said piston/cylinder unit, said auxiliary pressure chamber being separate from said main pressure chamber, said feedlines being separate from feedlines extending to said main pressure chamber for conveying pressure liquid thereto.

6. The roll assembly defined in claim 2 wherein said auxiliary pressure chamber communicates with said main pressure chamber via a passage in said support shoe, said auxiliary pressure chamber having an effective cross section larger than an effective cross section of said main pressure chamber.

7. The roll assembly defined in claim 2 wherein said piston/cylinder unit includes a piston firmly mounted to said crosspiece, further comprising additional pressurization means for controllably pressurizing said main pressure chamber, said additional pressurization means including an additional feedline extending through said crosspiece, a passage extending through said piston and a movable connecting line leading from said passage to said main pressure chamber, said additional feedline, said passage, said movable connecting line and said main pressure chamber all being in communication with each other.

8. The roll assembly defined in claim 7 wherein said connecting line takes the form of a bushing having a longitudinal axis and extending at least partially into said passage, said bushing being inclinable about said longitudinal axis, said bushing being provided with external sealing rings.

9. The roll assembly defined in claim 1 wherein said support shoe is provided with projecting lateral parts overhanging said crosspiece, said accumulation chambers being located in regions about said projecting lateral parts, further comprising movable connecting lines extending from said projecting lateral parts to said crosspiece, said connecting lines communicating with said accumulation chambers.

10. The roll assembly defined in claim 1 wherein said guiding members take the form of strips fastened to said support shoe substantially from said first end to said second end of said hollow roll, said strips being resilient about a longitudinal direction.

11. The roll assembly defined in claim 1 wherein said guiding members take the form of rigid strips integral with said support shoe, said strips extending substantially from said first end to said second end of said hollow roll, said strips slidingly engaging said inner surface.

12. The roll assembly defined in claim 11 wherein said strips are disposed in respective radial planes and are pressable against said inner surface.

13. The roll assembly defined in claim 11 wherein said strips are disposed in respective planes parallel to an action plane of the roll assembly and are pressable against said inner surface.

14. The roll assembly defined in claim 11 wherein said strips each have a substantially triangular cross section and an outwardly convex side engaging said inner surface, said convex side forming with said inner surface an acute angle.

15. The roll assembly defined in claim 14 wherein said strips each have an additional side disposed in a respective plane parallel to an action plane of the roll assembly.

16. The roll assembly defined in claim 15 wherein said additional side forms a guiding surface arranged for wiping action.

17. The roll assembly defined in claim 1 wherein said support shoe is symmetrical with respect to an action plane of the roll assembly.

18. The roll assembly defined in claim 1 wherein said support shoe is provided with an outwardly extending longitudinal projection disposed between said longitudinal sealing members and defining therewith a pair of longitudinal subchambers for enabling conduction of pressure liquid in opposite longitudinal directions.

19. The roll assembly defined in claim 1, further comprising means for enabling conduction of pressure liquid in opposite longitudinal directions in said accumulation chambers.

20. The roll assembly defined in claim 1 wherein said support shoe is subdivided into a plurality of partial support shoes aligned with one another in a longitudinal direction of said hollow roll, said shoes being separate from one another, said pressurization means including means for acting upon said partial support shoes with different pressures.

21. The roll assembly defined in claim 1, further comprising a pressure-proof partition extending in a transverse direction with respect to said main pressure chamber and subdividing said main pressure chamber into subchambers, further comprising additional pressurization means for pressurizing said subchambers at respective pressurization levels.

22. The roll assembly defined in claim 21 wherein said partition takes the form of a bulkhead having a radially outer edge with a profile conforming to said inner surface.

23. The roll assembly defined in claim 22 wherein said support shoe is supported on said crosspiece by at least one piston/cylinder unit and wherein said additional pressurization means includes an additional bulkhead disposed in a transversely extending slot in a piston of said piston/cylinder unit, said additional bulkhead being movable in said slot in an action direction of the roll assembly.

24. The roll assembly defined in claim 23 wherein the bulkheads are disposed in a common transverse plane, said support shoe being formed with at least one hole, a compression spring being provided in said hole, said spring engaging said bulkheads at opposite ends to press said bulkheads away from each other.

* * * * *